(12) United States Patent
Blümel

(10) Patent No.: US 7,416,315 B2
(45) Date of Patent: Aug. 26, 2008

(54) FACETED REFLECTOR, REFLECTOR CONFIGURATION, AND METHOD FOR PRODUCING THE REFLECTOR

(75) Inventor: Simon Blümel, Schierling (DE)

(73) Assignee: Osram OPTO Semiconductors GmbH, Regensburg (DE)

( * ) Notice: Subject to any disclaimer, the term of this patent is extended or adjusted under 35 U.S.C. 154(b) by 758 days.

(21) Appl. No.: 10/287,503

(22) Filed: Nov. 4, 2002

(65) Prior Publication Data
US 2003/0103281 A1 Jun. 5, 2003

Related U.S. Application Data

(63) Continuation of application No. PCT/DE01/01676, filed on May 3, 2001.

(30) Foreign Application Priority Data
May 4, 2000 (DE) ................. 100 21 725

(51) Int. Cl.
F21V 5/00 (2006.01)
F21V 5/08 (2006.01)
(52) U.S. Cl. ................. 362/327; 362/307; 362/308; 362/326; 362/331
(58) Field of Classification Search ................. 362/327, 362/339, 307, 308, 244, 245, 326, 331, 145, 362/147, 317, 800
See application file for complete search history.

(56) References Cited

U.S. PATENT DOCUMENTS

| 4,351,019 A | 9/1982 | Avery et al. |
| 4,690,490 A | 9/1987 | Mori |
| 4,830,899 A * | 5/1989 | Nakahashi et al. .......... 428/137 |
| 5,117,478 A | 5/1992 | Cobb, Jr. et al. |
| 5,128,842 A * | 7/1992 | Kenmochi .................... 362/95 |
| 5,335,151 A | 8/1994 | Dahlberg |
| 5,648,859 A * | 7/1997 | Hirabayashi et al. ........... 349/9 |
| 5,676,453 A * | 10/1997 | Parkyn et al. ................ 362/260 |
| 5,700,078 A * | 12/1997 | Fohl et al. ..................... 362/553 |
| 5,729,311 A * | 3/1998 | Broer et al. ..................... 349/65 |
| 5,880,886 A | 3/1999 | Milner |
| 5,890,796 A | 4/1999 | Marinelli et al. |
| 6,069,728 A * | 5/2000 | Huignard et al. ............. 359/245 |
| 6,193,383 B1 * | 2/2001 | Onikiri et al. .................. 362/26 |
| 6,575,584 B1 * | 6/2003 | Habraken .................... 362/609 |
| 2002/0141174 A1 * | 10/2002 | Parker et al. .................. 362/31 |

FOREIGN PATENT DOCUMENTS

| DE | 43 29 914 A1 | 3/1995 |
| DE | 196 22 670 A1 | 12/1997 |
| EP | 0 911 574 A2 | 4/1999 |
| GB | 1051440 | 12/1966 |
| WO | WO 95/25244 | 9/1995 |

\* cited by examiner

*Primary Examiner*—Jacob Y Choi
(74) *Attorney, Agent, or Firm*—Laurence A. Greenberg; Werner H. Stemer; Ralph E. Locher

(57) ABSTRACT

A faceted reflector includes a plurality of individual reflectors embedded in a carrier, one main area of the carrier being a light entry side, and another main area being a light exit side. The individual reflectors may be cavities in the carrier, which, preferably, have a prismatic form. The radiation to be reflected is subjected to total reflection at a part of the cavity interfaces.

23 Claims, 5 Drawing Sheets

FACETED REFLECTOR, REFLECTOR CONFIGURATION, AND METHOD FOR PRODUCING THE REFLECTOR

CROSS-REFERENCE TO RELATED APPLICATION

This application is a continuation of copending International Application No. PCT/DE01/01676, filed May 3, 2001, which designated the United States and was not published in English.

BACKGROUND OF THE INVENTION

Field of the Invention

The invention relates to a faceted reflector having a plurality of individual reflectors and a carrier.

Faceted reflectors are disclosed, for example, in U.S. Pat. No. 4,351,019 to Avery et al., which shows a reflector for a linear scanning light source. The reflector is divided, on its surface, into different individual reflectors in the form of strip-like facets. The individual facets serve for imaging the linear light source onto different regions of an area to be scanned. Such reflectors are used, for example, in photocopiers.

On the other hand, faceted reflectors can also be used for illumination purposes, for example, in road traffic or on buildings. In such a case, faceted reflectors of the above mentioned type have the disadvantage that the reflector strips are formed on the surface of the reflector. Such a configuration results in a highly structured area that is provided with numerous indentations and is greatly prone to soiling and difficult to clean. The configuration is disadvantageous particularly if the faceted reflectors is exposed to open weather. A reflector suitable for these purposes should be as free of structurings as possible at its external areas. Furthermore, such reflectors should be able to be produced cost-effectively because they are required in large numbers when used for marking purposes in road traffic.

SUMMARY OF THE INVENTION

It is accordingly an object of the invention to provide a faceted reflector, a reflector configuration, and a method for producing the reflector that overcome the hereinafore-mentioned disadvantages of the heretofore-known devices and methods of this general type and that has external areas with no reflection structures and that can preferably be produced cost-effectively.

With the foregoing and other objects in view, there is provided, in accordance with the invention, a faceted reflector for reflecting radiation along an optical path, including a carrier having a first main area forming an entry area for the radiation to be reflected and a second main area forming an exit area for the radiation to be reflected, the carrier being formed in one piece at least for a part of the optical path of the radiation to be reflected, and individual reflectors each embedded in the carrier.

The Invention provides for the individual reflectors (facets) to be embedded in a radiation-transmissive or radiation-partly-transmissive carrier. The carrier has a first and a second main area, the radiation to be reflected, generally visible light, entering into the carrier through the first main area (entry area), being reflected at the individual reflectors and leaving the carrier again through the second main area (exit area). In such a case, the carrier is, preferably, constructed in one piece in the radiation direction so that, for the radiation to be reflected or at least parts thereof, the optical path within the carrier is free of interfaces (apart from the deflection at the individual reflectors). The one-piece embodiment of the carrier in the radiation direction avoids additional undesirable reflections in the carrier.

Because the individual reflectors are disposed within the carrier, the entry and exit areas of the carrier can be structurelessly smooth. The advantage of such an embodiment is that an unstructured area is significantly less prone to soiling than a structured area and, if appropriate, is easier to clean.

In accordance with another feature of the invention, the individual reflectors are formed by cavities within the reflector. Because the transition from the carrier material into the cavity constitutes a transition from an optically denser medium into an optically thinner medium, total reflection occurs at the interface between carrier and cavity if the angle of incidence of the radiation, relative to the normal to the interface, is greater than the angle of total reflection. Consequently, the cavities in the carrier act as reflectors that enable the radiation to be deflected without any losses. It is advantageous that no additional elements are required for the individual reflectors.

In accordance with a further feature of the invention, the cavities are configured in a prism form. In such a case, partial regions of the prism lateral surface act as strip-shaped total reflectors so that the totality of these prismatic individual reflectors, advantageously, constitutes a planar reflector. The configuration is achieved, in particular, by virtue of the fact that the prismatic cavities are disposed parallel to one another with regard to the prism edges. Here and hereinafter, the edges of the prism lateral surface are to be understood as prism edges. A further advantage in the configuration of prismatic cavities is that such cavities are particularly simple to produce by a casting method.

In accordance with an added feature of the invention, the prisms have base areas and the base areas are triangular. When the cavities are configured as triangular prisms, such a configuration uses the simplest prism form for the hollow bodies and, thus, also constitutes a particularly cost-effective embodiment of the invention.

At the same time, such an embodiment enables a reflection without shadowing of the individual reflectors among one another and, at the same time, cavities that are as large as possible so that material outlay and mass of the faceted reflector are, advantageously, kept low.

In accordance with an additional feature of the invention, the reflectors have areas at which the radiation is reflected and the areas of the reflectors are parallel to one another.

In accordance with yet another feature of the invention, the cavities are completely surrounded by the carrier material and, as a result, there is no connection to the surroundings. Such a configuration advantageously prevents the ingress of moisture and soiling into the cavities, which, if deposited on the reflective interfaces, can disturb the total reflection and, thus, reduce the efficiency of the faceted reflector.

In accordance with yet a further feature of the invention, a transparent or semitransparent plastic is used as carrier material. On account of the good shapeability of plastics, the reflection structures according to the invention can easily be formed within a plastic carrier. A further advantage is that the color of the light radiated by the reflector can be modified with no special outlay by coloring the plastics.

With the objects of the invention in view, there is also provided a reflector configuration, including two faceted reflectors for reflecting radiation respectively along an optical path, each of the reflectors having a carrier having a first main area forming an entry area for the radiation to be reflected and a second main area forming an exit area for the radiation to be reflected, the carrier being formed in one piece at least for a part of the respective optical path of the radiation to be reflected, individual reflectors each embedded in the carrier, and the first main areas of each of the two faceted reflectors are connected in an angled manner along an edge.

In accordance with yet an added feature of the invention, the first main areas form an angle defining an inner region and a light source is disposed in the inner region of the angle formed by the reflectors.

In a particularly preferred development of the invention, two faceted reflectors are connected in an angular manner at two edges of the respective entry area. The faceted reflector, thus, formed deflects the light radiated in in two different directions. In conjunction with a light source, such a configuration produces a luminous element that, advantageously, requires only a single light source for two-sided radiation. Such luminous elements can be used in road traffic as roadway demarcation or as warning light, and the two radiation directions can be oriented in both directions of travel. Furthermore, such luminous elements can be used as facade illumination or for illuminating building edges.

In accordance with yet an additional feature of the invention, a light source is disposed on the entry side of the faceted reflector. In the case of a luminous element thus formed, the reflector, advantageously, fulfills two functions because it deflects the light generated by the light source and, at the same time, covers the light source in the emission direction. The latter function is made possible by the fact that the individual reflectors are disposed between entry and exit areas of the faceted reflector. In the case of reflectors according to the prior art, by contrast, the entry area is, at the same time, the exit area as well so that such reflectors cannot be used as covering in the radiation direction of the light source.

In accordance with again another feature of the invention, the light source is a light-emitting diode or a plurality of light-emitting diodes.

With the objects of the invention in view, there is also provided a radiation reflecting configuration, including a light source emitting radiation, at least one faceted reflector reflecting the radiation along an optical path, the reflector having a carrier having a first main area forming an entry side for the radiation to be reflected and a second main area forming an exit side for the radiation to be reflected, the carrier being formed in one piece at least for a part of the optical path of the radiation to be reflected, and individual reflectors each embedded in the carrier, and the light source disposed on the entry side.

With the objects of the invention in view, there is also provided a method for producing a faceted reflector, including the steps of providing a casting mold with a recess into which projecting elements protrude for forming cavities in the faceted reflector, filling the recess with a radiation-transmissive molding compound to at least partly encapsulate the projecting elements and form in the recess a faceted reflector for reflecting radiation along an optical path, the reflector having a carrier with a first main area forming an entry area for the radiation to be reflected, a second main area forming an exit area for the radiation to be reflected, the carrier being formed in one piece at least for a part of the optical path of the radiation to be reflected, and embedded cavities each having interfaces, the radiation to be reflected being subjected to total reflection at a part of the interfaces of the cavities, curing the molding compound, and removing the casting mold from the formed faceted reflector.

In accordance with again an added mode of the invention, the casting mold is in two parts.

In accordance with again an additional mode of the invention, the casting mold is an injection molding casting mold.

In accordance with still another mode of the invention, the casting mold is a transfer molding casting mold.

With the objects of the invention in view, there is also provided a method for marking, including the steps of providing a light source emitting radiation, directing the radiation of the light source to an entry side of at least one faceted reflector having a carrier with a first main area forming the entry side, a second main area forming an exit side, and individual embedded reflectors, the carrier being formed in one piece at least for a part of the optical path of the radiation to be reflected in the reflector,-reflecting the radiation along the optical path through the reflector and out the exit side of the carrier, and placing the reflector at a road as one of a self-luminous road marker and a roadway edge marker.

With the objects of the invention in view, there is also provided a method for marking a facade, including the steps of providing a light source emitting radiation, directing the radiation of the light source to an entry side of at least one faceted reflector having a carrier with a first main area forming the entry side, a second main area forming an exit side, and individual embedded reflectors, the carrier being formed in one piece at least for a part of the optical path of the radiation to be reflected in the reflector, reflecting the radiation along the optical path through the reflector and out the exit side of the carrier, and placing the reflector at the facade for illuminating the facade.

With the objects of the invention in view, there is also provided a method for marking a building, including the steps of providing a light source emitting radiation, directing the radiation of the light source to an entry side of at least one faceted reflector having a carrier with a first main area forming the entry side, a second main area forming an exit side, and individual embedded reflectors, the carrier being formed in one piece at least for a part of the optical path of the radiation to be reflected in the reflector, reflecting the radiation along the optical path through the reflector and out the exit side of the carrier, and placing the reflector at the building for illuminating at least sides of the building.

Other features that are considered as characteristic for the invention are set forth in the appended claims.

Although the invention is illustrated and described herein as embodied in a faceted reflector and method for producing the reflector, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
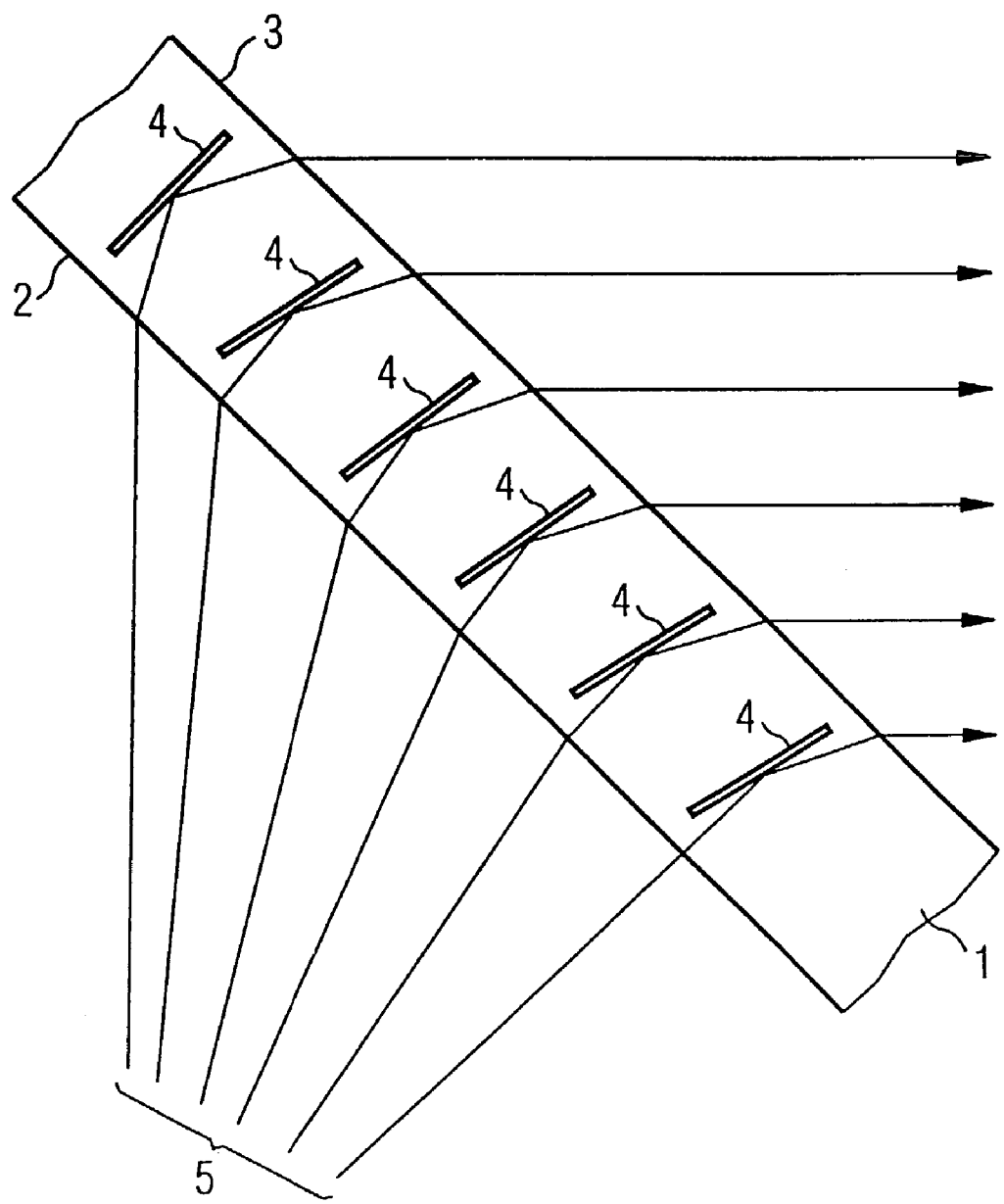
FIG. 1 is a fragmentary, cross-sectional view of a first exemplary embodiment of a faceted reflector according to the invention.

Referring now to the figures of the drawings in detail and first, particularly to FIG. 1 thereof, their is shown a faceted reflector having a transparent carrier 1 with a first main area 2 and a second main area 3. In the figure, the first main area 2 constitutes the light entry side and the second main area 3 constitutes the light exit side. The light rays 5 to be reflected enter into the carrier 2 on the entry side, are deflected at the individual reflectors 4 and leave the carrier on the exit side 3.

The carrier, itself, is composed of a transparent plastic, such as, for example, polymethyl methacrylate (PMMA) or polycarbonate (PC). For use in open surroundings, it is favorable here to use UV-resistant PMMA or PC in order to prevent rapid yellowing and aging of the carrier material. Depending on the use, the plastic may be colored, for example, orange for use as a roadway edge marking. An embodiment of the carrier made of glass, for example, pressed glass, would also be possible.

As reflectors, it is possible, on one hand, for metal strips to be embedded in the plastic carrier. On the other hand, as described below, it is particularly cost-effective to construct the reflectors as cavities in the carrier. A combination, for example, cavities with metallized interfaces, is also possible.

The orientation of the individual reflectors with respect to one another makes it possible to configure the form of the radiated light pencil. In the case of the exemplary embodiment shown in FIG. 1, the reflectors are disposed such they are slightly rotated relative to one another so that a divergent light pencil on the input side is transformed approximately into a parallel pencil on the output side. As an alternative, through an appropriate configuration of the individual reflectors, the faceted reflector can be used for focusing or expanding the light pencil.

Figure 2:
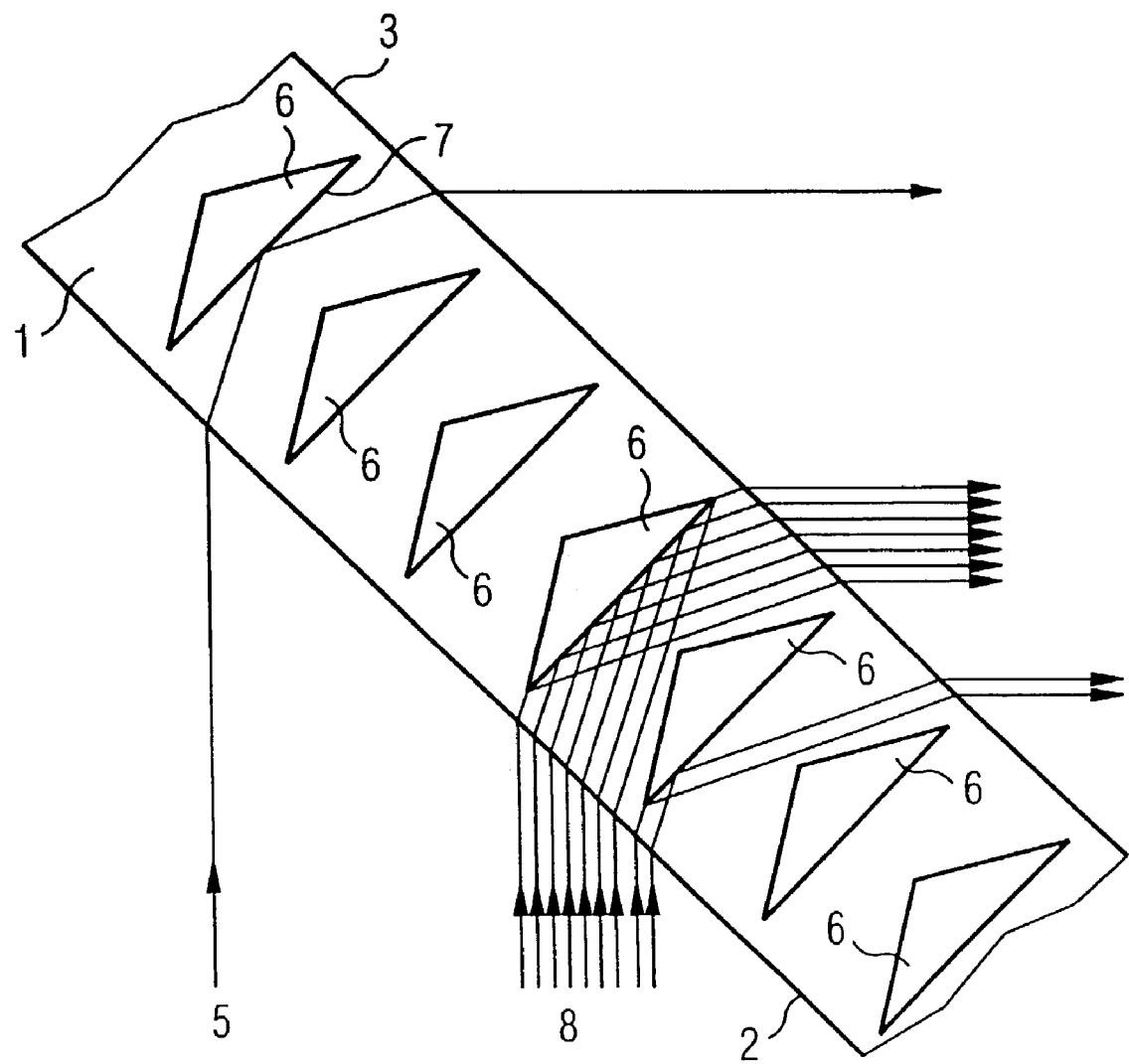
FIG. 2 is a fragmentary, cross-sectional view of a second exemplary embodiment of a faceted reflector according to the invention.

In the case of the exemplary embodiment illustrated in FIG. 2, the individual reflectors are formed by prismatic cavities 6 with a triangular base area in the carrier 1. A light ray 5 to be reflected enters into the carrier, is refracted here at the entry area 2 and impinges on the base area 7 of a prismatic cavity. Because the carrier material is optically denser than the air-filled cavity, light whose angle of incidence on the carrier material/cavity interface is greater than the angle of total reflection is totally reflected at the interface. The totally reflected light ray, then, impinges on the exit area 3 at an angle that is less than the angle of total reflection, is refracted there again and leaves the carrier 1.

The pencil of rays 8 reveals that the shadow space between two successive individual reflectors approximately represents a triangle in cross-section. Therefore, triangular prisms, that is to say, prisms with a triangular base area, are particularly advantageous as cavities because, on one hand, they ensure a shadowing-free reflection and, on the other hand, largely fill the shadow space so that the faceted reflector has a high total reflectivity and, at the same time, can be produced with a low outlay on carrier material. Consequently, the weight of the reflector is also kept low as a result.

Figure 3A:
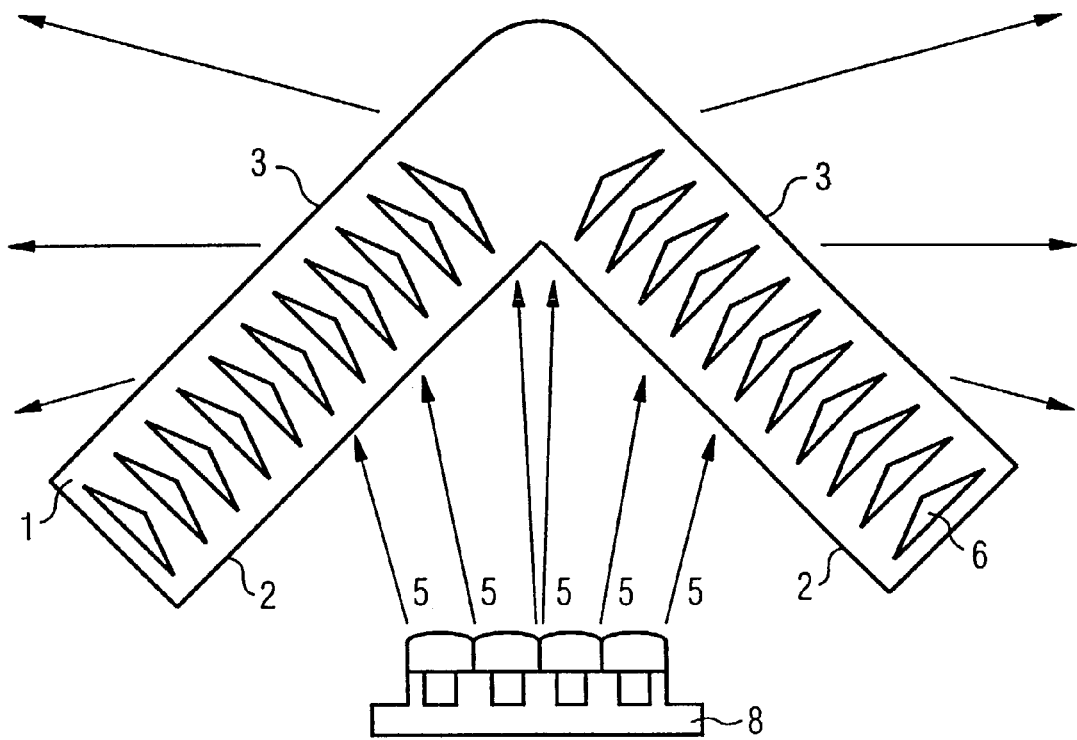
FIG. 3A is a fragmentary, cross-sectional view of a third exemplary embodiment of a faceted reflector according to the invention.

FIG. 3A shows a configuration including two faceted reflectors that are connected in an angular manner at an edge of the respective entry area. The reflectors are each configured with individual reflectors in the form of triangular prisms 6. The configuration is illuminated by a single light source 8. By way of example, a light-emitting diode or a light-emitting diode array is suitable for such a purpose. A degree of expansion of the light pencil may be advantageous for illumination and signaling purposes, and can be achieved, for example, by a light-emitting diode with a front lens structure. It is equally possible, as already described, to shape the light pencil by a special orientation of the individual reflectors.

Figure 3B:
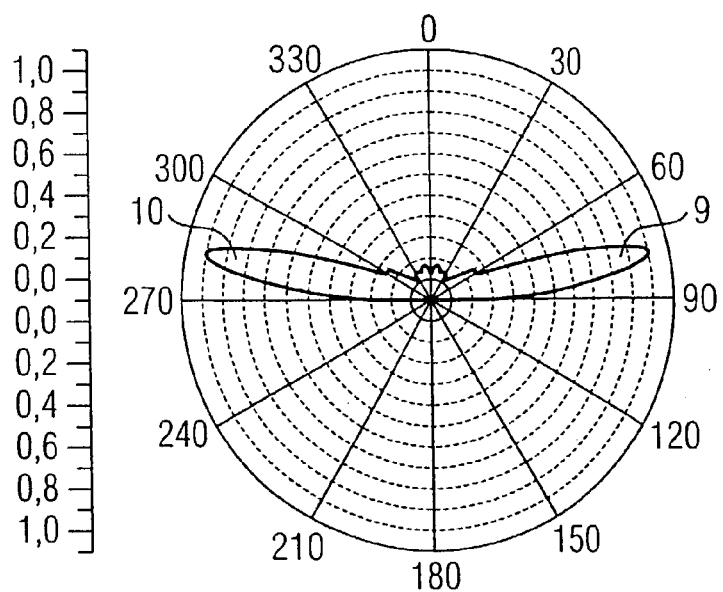
FIG. 3B is a radiation characteristic diagram of the reflector of FIG. 3A in the sectional plane illustrated in FIG. 3A, with relative radiation intensity plotted as distance from the coordinate origin for all directions in the plane of the drawing.

As a result of the angular construction of the reflector, the light radiated in is split into two components that are radiated in diametrical directions. The radiation characteristic of such a reflector in the sectional plane shown is illustrated in FIG. 3B. The relative radiation intensity is plotted as distance from the coordinate origin for all directions in the plane of the drawing. A light source with a beam expansion of about 10° serves as illumination. As shown by the two identical radiation lobes 9 and 10, the light is radiated in equal proportions in opposite directions that form approximately an angle of 155° with one another. The beam expansion of 10° is approximately maintained.

Figure 3C:
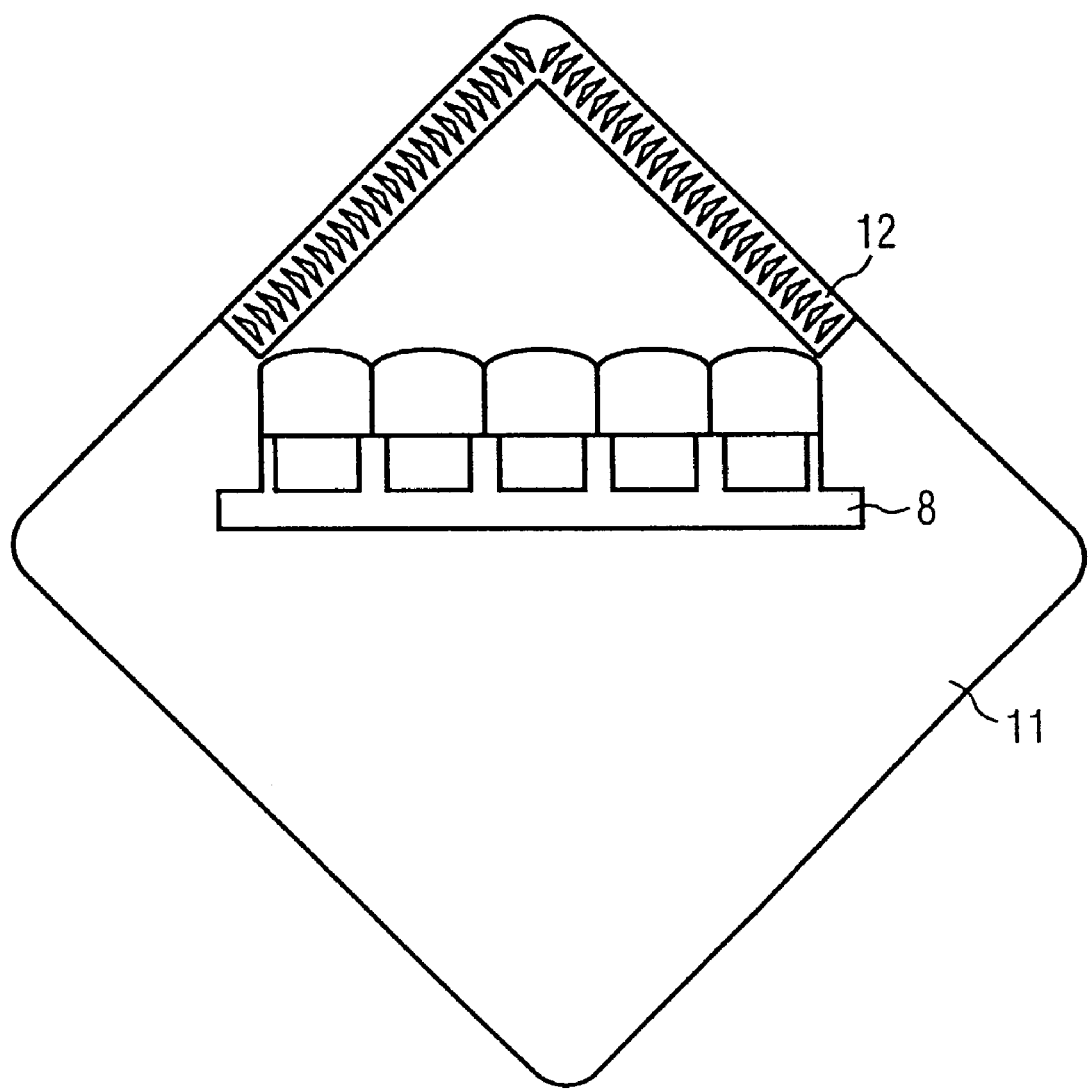
FIG. 3C is a fragmentary, cross-sectional view of the faceted reflector of FIG. 3A as a road edge marking column.

In an advantageous manner, such a configuration of a faceted reflector, at the same time forms, a covering of the light source in the emission direction. For the use as a self-luminous roadway edge marking, such a configuration can be incorporated into a road edge marking column, as shown in section in FIG. 3C. Such marking columns usually include a tubular hollow body 11 and can be used as a housing for the light source 8. On the radiation side, a faceted reflector 12 is inserted into the column and radiates the light generated by the light source 8 in both directions of travel of the roadway to be demarcated. Consequently, complete encapsulation for protection of the light source 8 is ensured. On account of the smooth, unstructured entry and exit areas, the reflector is largely resistant to soiling even under harsh ambient conditions.

Such freedom from soiling is increased further if the cavities are completely surrounded by the carrier material so that foreign substances, such as spray water and moisture, for example, which impair the reflection behavior of the individual reflectors, are unable to penetrate into the cavities. Because such closed-off cavities are difficult to produce in the context of an injection molding method, a two-part construction of the faceted reflector is advantageous.

Figure 4A:
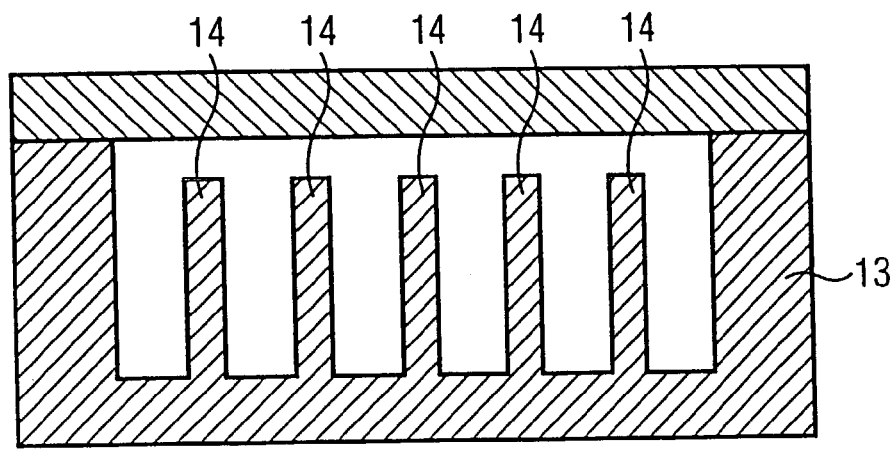
FIG. 4A is a fragmentary, cross-sectional view of a mold for making the fourth exemplary embodiment of a two-part faceted reflector according to the invention shown in FIG. 4B.
Figure 4B:
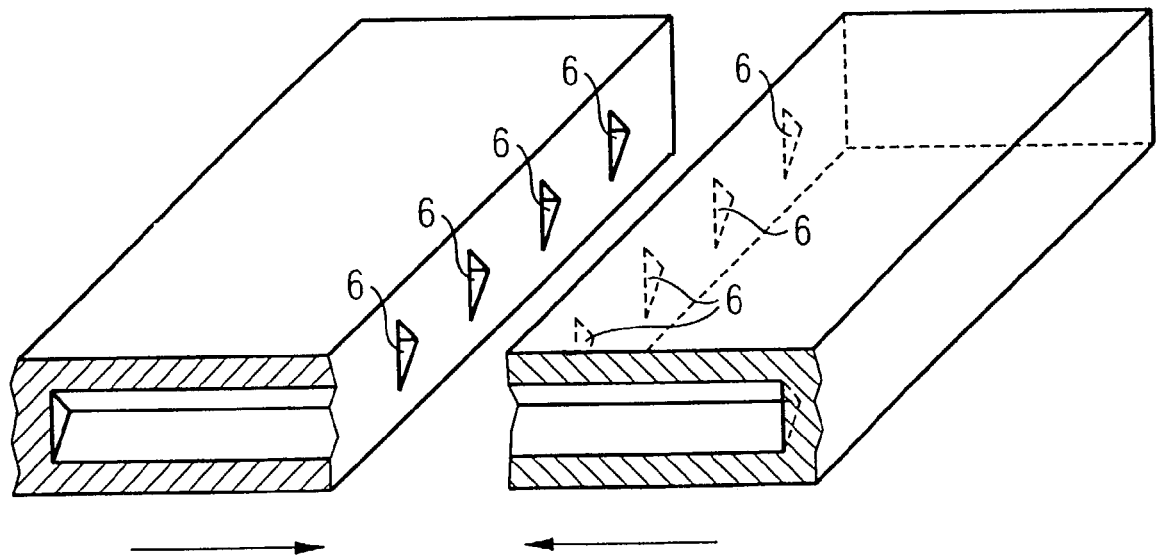
FIG. 4B is a fragmentary, perspective and partially hidden cross-sectional view of a fourth embodiment of a two-part faceted reflector according to the invention.

Such a configuration is illustrated in FIG. 4B. Use is made of two faceted reflectors with prismatic cavities that are closed off in the direction of the prism edges on one side and are open on the other side. Such reflectors can easily be produced in the injection molding method. To that end, as shown in FIG. 4A, use is made, for example, of a two-component injection mold 13 with a plurality of finger-like elements 14 that project into the molding and, thus, form the cavities 6 in the molding. The two faceted reflectors are oriented toward one another with the open ends of the cavities and joined together, for example, by adhesive bonding or welding. The faceted reflector so formed, thus, has cavities that are closed off on all sides and, at the same time, is easy to produce using an injection molding method.

The explanation of the invention using the exemplary embodiments described should not, of course, be regarded as a restriction of the invention. In particular, the form of the reflector carrier and also the orientation of the individual reflectors can be adapted to individual desired configurations to the greatest possible extent.

I claim:

1. A faceted reflector for reflecting radiation along an optical path, comprising:
    a carrier having:
        a first main area forming an entry area for the radiation to be reflected; and
        a second main area forming an exit area for the radiation to be reflected, said carrier being formed in one piece at least for a part of the optical path of the radiation to be reflected; and
    a plurality of cavities formed in said carrier, said cavities having interfaces forming individual reflectors each embedded in said carrier and said cavities being completely enclosed by said carrier; and
    wherein the radiation to be reflected is subjected to total reflection at a part of said interfaces of said cavities.

2. The faceted reflector according to claim 1, wherein said cavities are prisms.

3. The faceted reflector according to claim 2, wherein:
    each of said individual prismatic cavities has edges; and
    said edges of said individual prismatic cavities are parallel to one another.

4. The faceted reflector according to claim 2, wherein:
    each of said cavities has an edge; and
    said edges of said cavities are parallel to one another.

5. The faceted reflector according to claim 2, wherein:
    said prisms have base areas; and
    said base areas are triangular.

6. The faceted reflector according to claim 3, wherein:
    said prisms have base areas; and
    said base areas are triangular.

7. The faceted reflector according to claim 1, wherein:
    said reflectors have areas at which the radiation is reflected; and
    said areas of said reflectors are parallel to one another.

8. The faceted reflector according to claim 1, wherein said cavities are completely enclosed by said carrier.

9. The faceted reflector according to claim 1, wherein said carrier is of a plastic selected from one of the group consisting of a transparent plastic and a semitransparent plastic.

10. A reflector configuration, comprising:
    two faceted reflectors for reflecting radiation respectively along an optical path, each of said reflectors having:
        a carrier having:
            a first main area forming an entry area for the radiation to be reflected; and
            a second main area forming an exit area for the radiation to be reflected, said carrier being formed in one piece at least for a part of the respective optical path of the radiation to be reflected; and
        a plurality of cavities formed in said carrier, said cavities having interfaces forming individual reflectors each embedded in said carrier and said cavities being completely enclosed by said carrier; and
        wherein the radiation to be reflected is subjected to total reflection at a part of said interfaces of said cavities; and
    said first main areas of each of said two faceted reflectors are connected in an angled manner along an edge.

11. The configuration according to claim 10, wherein:
    said first main areas form an angle defining an inner region; and
    a light source is disposed in said inner region of said angle formed by said reflectors.

12. The configuration according to claim 11, wherein said light source is a light-emitting diode.

13. The configuration according to claim 11, wherein said light source is a plurality of light-emitting diodes.

14. A radiation reflecting configuration, comprising:
    a light source emitting radiation;
    at least one faceted reflector reflecting the radiation along an optical path, said reflector having:
        a carrier having:
            a first main area forming an entry side for the radiation to be reflected; and
            a second main area forming an exit side for the radiation to be reflected, said carrier being formed in one piece at least for a part of said optical path of the radiation to be reflected; and
        a plurality of cavities formed in said carrier, said cavities having interfaces forming individual reflectors each embedded in said carrier and said cavities being completely enclosed by said carrier; and
        wherein the radiation to be reflected is subjected to total reflection at a part of said interfaces of said cavities; and
    wherein said light source is disposed on said entry side.

15. The configuration according to claim 14, wherein said light source is a light-emitting diode.

16. The configuration according to claim 14, wherein said light source is a plurality of light-emitting diodes.

17. A method for producing a faceted reflector, which comprises:
    providing a casting mold with a recess into which projecting elements protrude for forming cavities in the faceted reflector;
    filling the recess with a radiation-transmissive molding compound to at least partly encapsulate the projecting elements and form in the recess a faceted reflector for reflecting radiation along an optical path, the reflector having a carrier with:
        a first main area forming an entry area for the radiation to be reflected;
        a second main area forming an exit area for the radiation to be reflected, the carrier being formed in one piece at least for a part of the optical path of the radiation to be reflected; and
        embedded cavities completely enclosed by said carrier and each having interfaces, the radiation to be reflected being subjected to total reflection at a part of the interfaces of the cavities;
    curing the molding compound; and
    removing the casting mold from the formed faceted reflector.

18. The method according to claim 17, wherein the casting mold is in two parts.

19. The method according to claim 17, wherein the casting mold is an injection molding casting mold.

20. The method according to claim 17, wherein the casting mold is a transfer molding casting mold.

21. A method for marking, which comprises:
    providing a light source emitting radiation;
    directing the radiation of the light source to an entry side of at least one faceted reflector having a carrier with a first main area forming the entry side, a second main area forming an exit side, and individual embedded reflectors formed as cavities in the carrier, the cavities being completely enclosed by the carrier and the cavities each having interfaces, the carrier being formed in one piece at least for a part of the optical path of the radiation to be reflected in the reflector;

reflecting the radiation along the optical path through the reflector, thereby subjecting the radiation to total reflection at a part of the interfaces of the cavities, and out the exit side of the carrier; and placing the reflector at a road as one of a self-luminous road marker and a roadway edge marker.

22. A method for marking a facade, which comprises:

providing a light source emitting radiation;

directing the radiation of the light source to an entry side of at least one faceted reflector having a carrier with a first main area forming the entry side, a second main area forming an exit side, and individual embedded reflectors formed as cavities in the carrier, the cavities being completely enclosed by the carrier and the cavities each having interfaces, the carrier being formed in one piece at least for a part of the optical path of the radiation to be reflected in the reflector;

the radiation to be reflected is subjected to total reflection at a part of said interfaces of said cavities, reflecting the radiation along the optical path through the reflector, thereby subjecting the radiation to total reflection at a part of the interfaces of the cavities, and out the exit side of the carrier; and placing the reflector at the façade for illuminating the façade.

23. A method for marking a building, which comprises:

providing a light source emitting radiation;

directing the radiation of the light source to an entry side of at least one faceted reflector having a carrier with a first main area forming the entry side, a second main area forming an exit side, and individual embedded reflectors formed as cavities in the carrier, the cavities being completely enclosed by the carrier and the cavities each having interfaces, the carrier being formed in one piece at least for a part of the optical path of the radiation to be reflected in the reflector;

reflecting the radiation along the optical path through the reflector, thereby subjecting the radiation to total reflection at a part of the interfaces of the cavities, and out the exit side of the carrier; and placing the reflector at the building for illuminating at least sides of the building.

* * * * *